United States Patent [19]

Do et al.

[11] Patent Number: 4,988,128

[45] Date of Patent: Jan. 29, 1991

[54] COUPLING FOR A SHAFT HAVING A REINFORCEMENT FRAMEWORK

[75] Inventors: Anh T. Do, La Celle Saint Cloud; Michel Huvey, Bougival, both of France

[73] Assignee: Institut Francais du Petrole, Rueil Malmaison, France

[21] Appl. No.: 104,256

[22] Filed: Oct. 5, 1987

[30] Foreign Application Priority Data

Oct. 7, 1986 [FR] France ................................ 86 14040

[51] Int. Cl.⁵ ............................................ F16L 39/00
[52] U.S. Cl. .................................... 285/149; 285/297
[58] Field of Search ...................... 285/149, 294, 297; 138/109

[56] References Cited

U.S. PATENT DOCUMENTS

| | | | |
|---|---|---|---|
| 2,150,471 | 3/1939 | Van Vulpen | 285/149 |
| 2,685,459 | 8/1954 | Panagrossi | 285/149 |
| 3,415,545 | 12/1968 | Frey et al. | 285/149 |
| 4,033,612 | 7/1977 | Chevalier | 285/297 X |

FOREIGN PATENT DOCUMENTS 688757 4/1965 Italy ................................ 285/149

Primary Examiner—Dave W. Arola
Attorney, Agent, or Firm—Antonelli, Terry, Stout & Kraus

[57] ABSTRACT

The invention provides a coupling and a method of manufacturing such a coupling for a shaft having at least one free traction resistant reinforcement framework, said drawn, wedge or plugged coupling including, in the immediate vicinity of the anchorage means, free threads of the tractive force resistant framework and an elastomer cushion through which the threads pass, said cushion increasing the resistance of the couplings and allowing a better use of the shafts.

9 Claims, 2 Drawing Sheets

COUPLING FOR A SHAFT HAVING A REINFORCEMENT FRAMEWORK

BACKGROUND OF THE INVENTION

1. Field of the Invention

The present invention relates to an improvement to connections for rigid or flexible shafts, such as tubes or cables, having a reinforcement framework withstanding at least the tractive forces, said framework being formed of threads free to move with respect to each other over the part of the shaft external of the connection, as well as the method for producing such connections.

Such shafts may be fluid transfer tubes, such as oil effluents.

The invention is particularly well adapted to shafts subjected to high internal pressures and to fatigue due particularly to the differential pressure, traction or flexion variations. It applies to all kinds of framework thread materials such as metal, Kevlar, polyamide, glass or carbon fibers impregnated with stabilizable plastic material, disposed in layers of parallel threads or in braids.

By stabilizable plastic material is meant substances able to assume a stable form by a physical or chemical process such as fusion with cooling or cross-linking. These materials may, for example, be thermo plastic materials, heat hardenable materials, elastomers or metals.

2. Description of the prior art

The transfer of forces from one shaft section including free frameworks to the next section or to an anchorage point is achieved by means of couplings. There exist numerous types of couplings. Some couplings are called "drawn", others are called "wedged", finally others are called "plugged".

Drawn couplings use, at least for the traction framework, the embedment of the threads of this framework in a block of malleable material, this block is formed and self embedded in the conical internal form of the coupling by the so called wire drawing operation.

Wedge couplings provide the anchorage of at least the traction framework by jamming its threads between hard jaws which interfit.

Plugged couplings provide the anchorage of at least the traction framework by jamming, in an internal conical form of the coupling, a plug in which the ends of the framework threads are embedded, this plug may be obtained by casting, by injection, or by any other means for impregnating the threads. The triaxial compression of the plug in the conical shape provides holding of the threads. The products used for plugging are materials which are liquid at the time of shaping, solid and resistant to deformation at the time of use, such as metals or heat hardenable resins.

Whether the shafts are rigid or flexible, cables or tubes, the performances of these couplings are rarely equal to unity. That is to say that the cable or tube breaks flush with the coupling or even thereinside, for forces which rarely reach the value calculated from the proper strength of the strands or threads. As a general rule, the tube breaks at the level of the coupling for forces which are rarely greater than two thirds of the above mentioned calculated value.

Thus, it is only after a long period of static service that flexible cables or flexible tubes break in the current length, especially if they are subjected to bending. The current length of a shaft corresponds to the zone of the shaft insensitive to the influence of the couplings which it has at its ends. For a shaft of diameter D, the current length begins and finishes at about 2 to 3D from the flush position of each of the couplings. In somes cases, however, using resin plugged couplings, in suitably dimensioned cones, the efficiency is equal to unity and the breakage is obtained in the current length.

Despite everything it is rare for this favorable behavior to be maintained when the flexible shaft thus formed is subjected to alternating flexion or pulsed pressure fatigue, this fatigue resulting in breakage flush with the couplings, when it has not been previously induced in the current length by corrosion, wear or seizure phenomena.

The couplings plugged more particularly with resin do not damage the ends of the threads of the framework and allow shafts to be used under higher tractive forces. However, the dynamic attenuation phenomena of the performance of plugged couplings leads more particularly to reducing the load exerted on these couplings and, consequently, the other types of couplings are often preferred, although not having the same efficiency in use, for their efficiency is then maintained during the whole lifespan of the equipment. The initial lower strength is thus maintained intact for a longer time.

With the device and method of implementation of the invention, an efficiency equal to unity for resin plugged couplings may be kept for periods equal to the lifespan of the flexible or rigid shaft, and the efficiency of drawn couplings and wedge couplings may be improved while maintaining their useful lifespan.

SUMMARY OF THE INVENTION

The device and method of the invention consists in interposing between the main anchorage and the ambient environment (air, water or oil as a general rule), an elastomer cushion whose length and stiffness are adapted to the proper stiffness of the armours, so as to allow regular adaptation of the radii of curvature of the threads under the effect of the stresses, and to remove the embedment effect, particularly perceptible at the outlet of the anchorage resin, of the wedges, or of the drawn block.

Numerous tests have shown that, in order to be totally efficient, the length of the elastomer cushion (-measured in the direction of the axis of the flexible shaft), must be equal to at least three times the radius of gyration of the armours, namely about ten times the thickness of the armour for a rectangular based armour.

Solid or hollow reinforced shafts, rigid or flexible, have one or more frameworks, each of them being proportioned so as to withstand, among other things, the pressure and/or tractive forces. Each of these frameworks is formed of one or more layers of threads, each of which forms an armour.

The radius of gyration is the square root of the quotient of the moment of inertia of a cross section of a solid body, with respect to its center of gravity, multiplied by the area of the section.

This length may be increased without disadvantage to the extent that such an increase does not have serious consequences on the length of the couplings.

The invention provides a coupling for a shaft having at least one reinforcement framework formed of free threads withstanding tractive forces at least, one of the ends of the framework being secured to the coupling by anchorage means.

This coupling is particularly characterized in that it includes an elastomer cushion through which the threads of the framework pass, the cushion being situated in the immediate vicinity of the anchorage means.

The elastomer cushion may have a longitudinal modulus of elasticity (Young's modulus) between 2 MPa and 200 MPa.

The anchorage means may include a core integral with the threads, the core cooperating with a cap secured to the coupling for providing anchorage of the shaft to the coupling. The shaft may be a flexible fluid transfer tube.

The tube may include a pressure resistant reinforcement framework which will be separated from the traction framework over at least the length included between the elastomer cushion and the end of one of the frameworks by a vault, and the cushion may be situated between the vault and the cap.

The traction framework may be formed of a braid.

The core and the elastomer cushion may form but a single piece.

The invention also provides a method of producing a coupling for a shaft having a reinforcement framework formed of free threads withstanding the tractive forces at least, the coupling including means for anchoring the threads.

This method is characterized particularly in that it includes the following steps:
 a mass of uncured elastomer to which its curing agents may have been added is introduced into the traction framework, flush with the anchorage means,
 the threads of the framework are anchored, and
 the elastomer mass is cured.

The elastomer mass may be introduced into the traction framework by carrying out the following successive steps:
 a ribbon of uncured elastomer is placed below and/or above the traction framework, and
 on this or these ribbons a sufficient pressure is applied for causing the elastomer to flow through the threads of the framework.

The uncured elastomer mass may be introduced into the framework by injection.

The method, applied to a coupling in which the anchorage of the threads is provided by plugging a core having a substantially truncated cone shape, the core cooperating with a conical inner form of the coupling so as to provide anchorage of the threads, may include the following steps:
 the uncured elastomer mass is first of all introduced into the framework so that the mass, cooperating with the inner form, defines a cavity for implantation of the core,
 a material intended to form the core is introduced into the cavity, and
 the elastomer mass is cured, the order of these last two steps may be reversed.

Cross linking of the material of the core and curing of the elastomer mass may be carried out simultaneously.

BRIEF DESCRIPTION OF THE DRAWINGS

The following description, which has no limitative character, will allow a man skilled in the art to well understand how the present invention may be put into practice. It is illustrated by the accompanying Figures in which.

DESCRIPTION OF THE PREFERRED EMBODIMENTS

Figure 1:
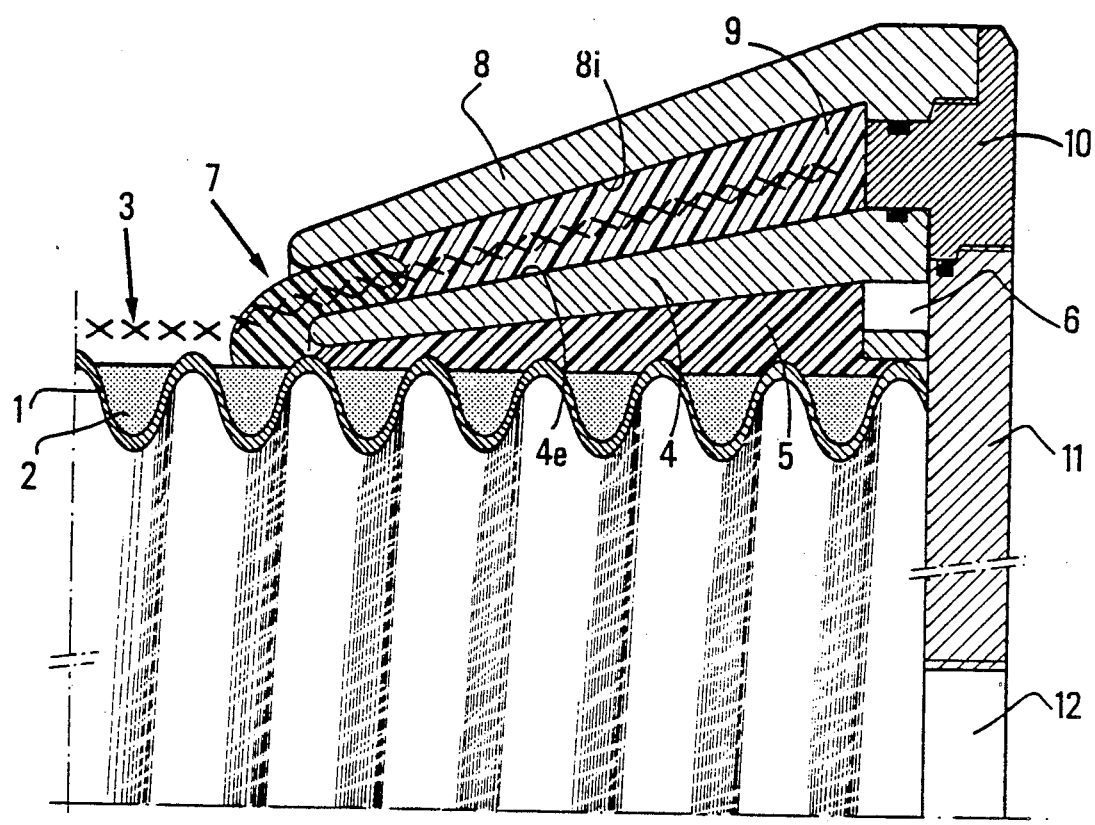
FIG. 1 is an axial half section of one example of using an elastomer cushion in accordance with the invention applied to a plugged coupling.

In FIG. 1 the flexible tube is formed, as described in patent FR-A-2 553 860 by an internal corrugated metal sheath 1 having a thickness of 0.4 mm, an inner diameter of 50 mm and an outer diameter of 60 mm whose corrugations are filled with a composite reinforcement 2 including glass fibers and epoxy resin molded in situ in proportions of 71% by weight of glass and 29% by weight of resin.

The assembly thus formed is covered with a braid 3 of Kevlar aramide threads 49, Kevlar being a registered trademark of Du Pont de Nemours.

Sheath 1 and its reinforcement 2 are intended to withstand the circumferential component of the internal pressure whereas the threads of braid 3 provides at least resistance to longitudinal traction.

At the ends of this flexible tube are placed different parts forming a sealing coupling. For its manufacture, vault 4, having conical internal and external surfaces, is laid on sheath 1 provided with its reinforcement 2. Vault 4 defines with the flexible tube 1, a space 5 which is filled, through injection holes 6, with heat hardenable resin or with a stabilizable material providing sealing between the flexible tube and vault 4.

The truncated cone shape of the hardenable resin material placed in space 5 contributes, with the triaxial compression exerted by the effect of the internal pressure of the tube, to provide self-sealing of the seal.

Figure 2:
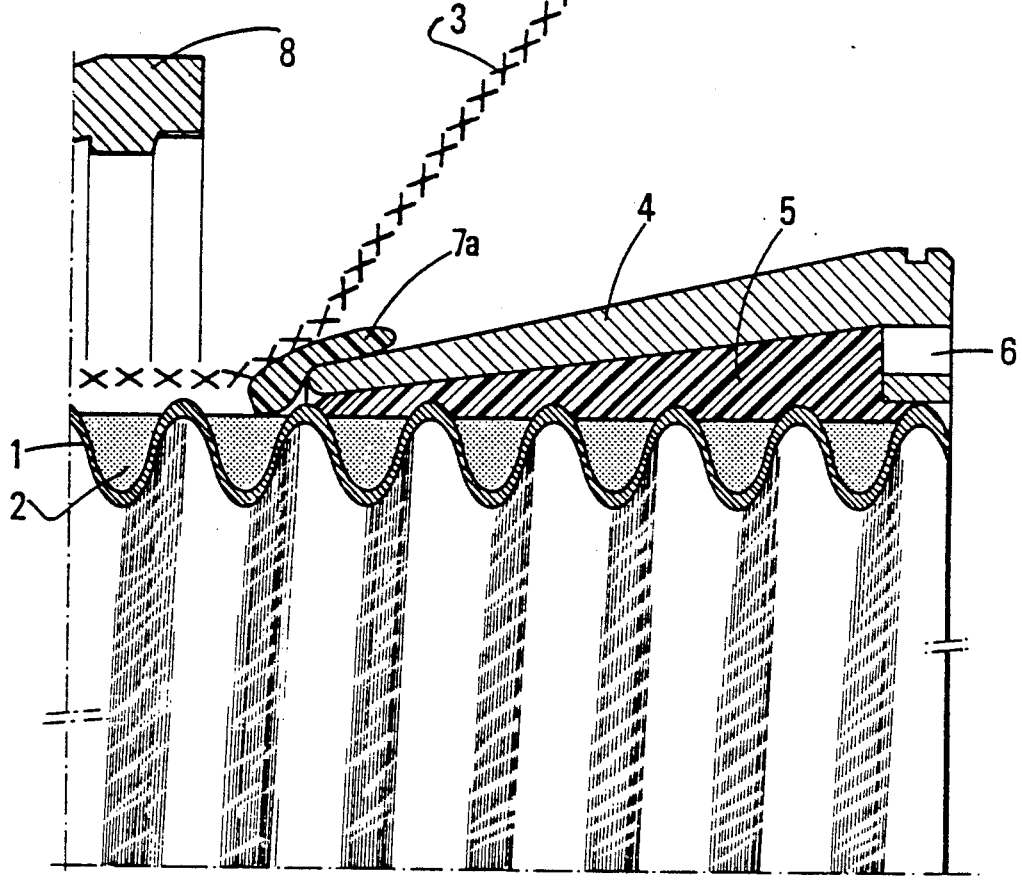
FIG. 2 illustrates a first step of forming the elastomer cushion for the coupling shown in FIG. 1.
Figure 3:
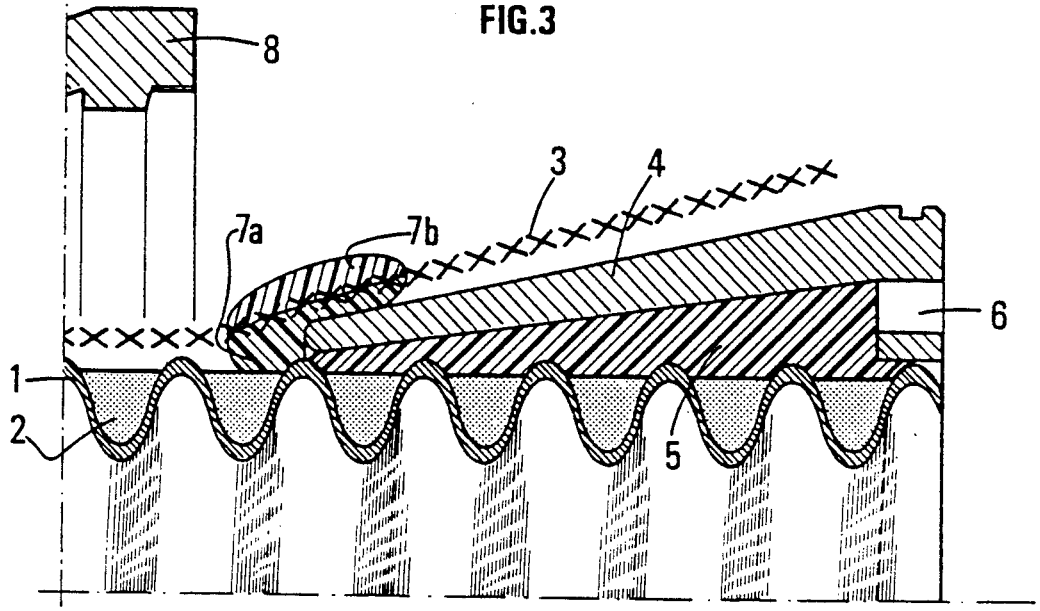
FIG. 3 shows a second step in forming the elastomer cushion for the coupling shown schematically in FIG. 1.

After the vault 4 has been laid, with braid 3 moved aside, or turned over, or else raised so that the threads are free (FIG. 2), a ribbon 7a of uncured silicone elastomer, to which its curing catalyst has been previously added, is laid at the end of smallest diameter. The free ends of braid 3 are then put back in place on vault 4 (FIG. 3), and a second silicone elastomer ribbon 7b is laid on the other side of the braid, in front of the first ribbon. The two ribbons are then caused to join up by flowing through the braid, by applying a light pressure, for example by means of an adhesive ribbon or tape. With the two ribbons joined up, the elastomer cushion 7 is thus formed.

The cushion may be formed from a large variety of elastomers whose characteristics, particularly the longitudinal modulus of elasticity, are adapted to the characteristics of the threads of the braid, or more generally to the characteristics, such as nature, number, dimensions, of the threads of the traction framework. These elastomers or any natural or synthetic rubber substances having sufficent elastic stress limit resistance will advantageously have a Young's modulus between 2 and 200 MPa.

After positioning of the elastomer cushion 7 and curing thereof, the cap 8 (FIG. 1) is installed. Then, in space 9 defined by the internal conical surface 8i of cap 8 and the external conical surface 4e of vault 4, cushion 7, the epoxy resin and its hardener form a cone by being flowed through the opening of space g between cap 8 and vault 4 placed towards the top, all around the free threads of braid 3 without any particular precaution being taken as regards its arrangement. The epoxy resin is of the DGEBA (A Bisphenol Diglycidylether) and the hardener of the TMD (trimethylhexamethylene diamine) type.

Before or after cross linking the resin which fills space 9 and which forms the material of a core, the heel 10 of the coupling is fitted on vault 4 while screwing it to cap 8. Heel 10 normally provides the connection of the flexible pipe or more generally of the shaft either with another shaft, or with an anchorage point.

But, for testing the coupling and the flexible tube, heel 10 has been provided with a lid 11 with an orifice 12.

As material for anchoring the braid, any other hardenable product could have been used which may be flowed or injected, having adapted characteristics. Elastomers identical to or different from the one which forms the resilient cushion 7 could also be used.

The tapered shape of the plug occupying space 9 provides efficient anchorage of braid 3.

An identical coupling is formed at the other end of the tube.

The tube including these couplings is then connected by orifice 12 to a hydraulic pump providing a regular increase of the pressure in the tube. Pressurization tests have shown that such a tube section tears at a pressure of 285 bars in the middle of the tube and not at the coupling.

This maximum value of the static pressure should be compared with that of a similar tube having the same coupling, but without the presence of the elastomer cushion 7.

During testing of the tube with coupling without cushion, breakage of the tube was obtained flush with the coupling at a pressure of 145 bars. For this test, contrary to the first test, care was taken to dispose the braid as well as possible at a constant thread angle.

In a second example of use of the coupling of the invention including an elastomer cushion 7, the tube which is flexible is formed from a stainless steel strip 1 of 0.8 mm seamed to 250 mm of internal diameter and coated with an extruded Rilsan (trademark registered by Atochem) sheath of an outer diameter of 298 mm, itself covered with two layers of composite threads withstanding the tractive forces at least and formed as described in the patent FR-A-2 494 401.

The two layers of threads were crossed and each laid at 55° with respect to the axis of the tube.

As in the embodiment shown in FIG. 1, a vault 4 was laid on the metal strip 1 and the Rilsan sheath under the two layers of threads 3 forming the reinforcement framework, and resin was introduced between the sheath and the vault 4 so as to provide sealing. The reinforcement frameworks were laid between the vault 4 and the cap 8.

The threads were anchored by forming an epoxy resin plug of 30 cm long between the vault 4 and cap 8.

After gelification of the resin, a polyurethane elastomer cushion 10 cm long and of a Shore hardness A equal to 85 was flowed between the vault 4 and the cap 8 where the threads emerged.

The coupling was finished by fitting and screwing the heel and the lid on the vault 4 and the cap 8.

After curing of the polyurethane elastomer at ambient temperature, the assembly was reheated so as to ensure the end of hardening of the epoxy resin.

Another lidded coupling or sleeve was placed at the other end of the sleeve. The tube was then placed on a dynamic flexion test bench and held at a pressure of 200 bars. The test was stopped without breakage after 6 million cycles.

This value should be compared with the three million five hundred thousand cycles obtained under the same conditions, before breaking flush with the coupling, of an identical flexible tube equipped with a similar sleeve but without elastomer cushion and having a plugging length of 40 cm instead of 30 cm.

The breakage of the same type of tube equipped with the same coupling without elastomer cushion subjected to a static pressure test was obtained at 540 bars over the current length of the tube.

The above described examples of use of an elastomer cushion in accordance with the invention are applied to plugged couplings and flexible tubes having a pressure resistant framework and a traction resistant framework, these frameworks being separated from each other at the level of the coupling by a vault 4.

Without departing from the scope of the present invention, the separation vault may be omitted for example by placing the ends of the framework assembly in the same plug and disposing an elastomer cushion in accordance with the described method, this cushion having passing therethrough at least the threads of the traction framework and being situated in the immediate vicinity of the plug.

What is claimed is:

1. In a coupling for a shaft comprising:
    an axially extending shaft having reinforcement means extended there along and coupling means at one end thereof; a sheath of braided threads, resisting tractive forces at least extending along said shaft and radially spaced from said reinforcement means and terminating adjacent said one end; said coupling including an elastomeric cushion at said one end thereof in which said threads are embedded; said coupling means anchoring said elastomeric cushion and the ends of said threads to said shaft end, and wherein said elastomeric cushion has a longitudinal modulus of elasticity (Young's modulus) between 2 MPs and 200 MPa.

2. In a coupling as for a shaft comprising:
    an axially extending shaft having reinforcement means extended therealong and coupling means at one end thereof; a sheath of braided threads, resisting tractive forces at least, extending along said shaft and radially spaced from said reinforcement means and terminating adjacent said one end; said coupling including an elastomeric cushion at said one end thereof in which said threads are embedded; said coupling means anchoring said elastomeric cushion and the ends of said threads to said shaft end; and wherein said coupling means include a core integral with said threads, said core cooperating with a cap which is external to the core and integral with the coupling so as to provide anchorage of the shaft to the coupling.

3. The coupling as claimed in claim 2, wherein the shaft is a flexible fluid transfer tube.

4. The coupling as claimed in claim 3, wherein said reinforcement means is located integrally of and separated from said sheath of braided threads over at least the length included between the elastomeric cushion and the end of one of the reinforcement means and threads by a vault, and at least a part of said elastomeric cushion is situated between said vault and said cap.

5. The coupling as claimed in claim 2, wherein said core and said elastomeric cushion form but a single piece.

6. In a coupling for a fluid transfer tube comprising: an outer cap having inner and outer walls;

an axially extending tube having reinforcement means including threads for resisting tensile forces which extending along the length of the tube and terminate in free end portions within said cap; and anchorage means in said coupling between said cap and said tube including an elastomeric cushion through which said threads pass, said cushion being situated between said reinforcement means and said cap inner wall, and wherein the transfer tube comprises a pressure resistant reinforcing framework positioned radially inwardly of said reinforcement means and includes a vault surrounding a portion of said transfer tube and positioned between said elastomeric cushion and an end of said tube.

7. The coupling as claimed in claim 6 wherein an inner surface of said vault is in the form of a hollow truncated cone and forms a space surrounding the end of said tube, and a heat hardenable resin material inside of said truncated core that provides sealing between the transfer tube and said vault.

8. In a coupling for a fluid transfer tube comprising: an outer cap having inner and outer walls;

an axially extending tube having reinforcement means including threads for resisting tensile forces which extending along the length of the tube and terminate in free end portions within said cap; and anchorage means in said coupling between said cap and said tube including an elastomeric cushion through which said threads pass, said cushion being situated between said reinforcement means and said cap inner wall, and wherein said cap has an inner surface in the form of a truncated hollow cone with means for connection to a transfer member adjacent to said coupling at the end of the cone having the larger dimension; and wherein said coupling further includes a pressure resistant framework that is positioned radially inwardly of said cap and includes a vault surrounding a portion of said transfer tube and positioned longitudinally between said elastomeric cushion and an end of said tube, the inner surface of said vault being in the form of a hollow truncated cone and forming a space surrounding the end of said tube, and a heat hardenable resin material that provides sealing between the flexible transfer tube and an inside surface of said vault; and a core of material into which said threads are embedded cooperating with an inner surface of said cap and an outer surface of said vault so as to provide anchorage between the cap and the transfer tube.

9. In a coupling for a shaft comprising: an axially extending shaft having reinforcement means extending therealong and coupling means at one end thereof; a sheath of braided threads, resisting tractive forces at least, extending along said shaft and radially spaced from said reinforcement means and terminating adjacent said one end; said coupling including an elastomeric cushion at said one end thereof into which said threads are embedded; and said coupling means anchoring said elastomeric cushion and the end of said threads to said shaft end.

* * * * *